(12) United States Patent
Son et al.

(10) Patent No.: US 10,976,086 B2
(45) Date of Patent: Apr. 13, 2021

(54) AIR CONDITIONER AND METHOD FOR CONTROLLING THE SAME

(71) Applicant: SAMSUNG ELECTRONICS CO., LTD., Suwon-si (KR)

(72) Inventors: Kil Soo Son, Ansan-si (KR); Seok Kyun Kim, Hwaseong-si (KR); Jong-Yeop Baek, Suwon-si (KR); Byoung-Ok Ahn, Suwon-si (KR); Dong-Ho Cho, Suwon-si (KR); Hyun Kook Kim, Suwon-si (KR); Hyo-Jun Shin, Suwon-si (KR); Sang Ho Yoo, Yongin-si (KR); Hong Seok Jun, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 110 days.

(21) Appl. No.: 15/982,517

(22) Filed: May 17, 2018

(65) Prior Publication Data

US 2018/0347878 A1    Dec. 6, 2018

(30) Foreign Application Priority Data

May 31, 2017    (KR) ......................... 10-2017-0067794

(51) Int. Cl.
*F25B 45/00*    (2006.01)
*F25B 41/06*    (2006.01)
(Continued)

(52) U.S. Cl.
CPC ................ *F25B 45/00* (2013.01); *F25B 1/04* (2013.01); *F25B 13/00* (2013.01); *F25B 31/026* (2013.01);
(Continued)

(58) Field of Classification Search
CPC .. F25B 45/00; F25B 1/04; F25B 13/00; F25B 31/026; F25B 41/062; F25B 49/02;
(Continued)

(56) References Cited

U.S. PATENT DOCUMENTS 2,141,715 A * 12/1938 Hilger ...................... F25B 5/02
                                                    62/200
5,109,676 A *  5/1992 Waters .................. F25B 41/062
                                                    62/117
(Continued)

FOREIGN PATENT DOCUMENTS

EP    2 685 181 A1    1/2014
EP    2730859          5/2014
(Continued)

OTHER PUBLICATIONS

International Search Report dated Sep. 18, 2018 in International Patent Application No. PCT/KR2018/005604.
(Continued)

*Primary Examiner* — Gordon A Jones
(74) *Attorney, Agent, or Firm* — Staas & Halsey LLP

(57) ABSTRACT

An air conditioner and a method for controlling the same are disclosed. The air conditioner implements a multistage expansion scheme by implementing serial connection between electronic expansion valves including in the R410A refrigerant-based air conditioner, and thus guarantees an optimum compression ratio in all cooling/heating load regions. Therefore, although cycle characteristics are changed by changing R410A refrigerant to R32 refrigerant, the air conditioner optimizes the cycle simply by controlling a degree of opening of electronic expansion valves, respectively. As described above, since the cycle optimization is implemented using the multistage expansion scheme in which legacy electronic expansion valves are coupled in series, the design modification is minimized without design (Continued)

modification of requisite constituent elements such as a heat exchanger, system implementation is facilitated, resulting in high efficiency in cost and productivity. Cooling/heating performance improvement and reliability guarantee are achieved under all load conditions, resulting in increased system efficiency.

6 Claims, 10 Drawing Sheets

(51) Int. Cl.
| | |
|---|---|
| *F25B 1/04* | (2006.01) |
| *F25B 31/02* | (2006.01) |
| *F25B 13/00* | (2006.01) |
| *F25B 49/02* | (2006.01) |

(52) U.S. Cl.
CPC ............ *F25B 41/062* (2013.01); *F25B 49/02* (2013.01); *F25B 49/022* (2013.01); *F25B 2309/004* (2013.01); *F25B 2341/063* (2013.01); *F25B 2341/065* (2013.01); *F25B 2341/0662* (2013.01); *F25B 2600/01* (2013.01); *F25B 2600/0253* (2013.01); *F25B 2600/2513* (2013.01); *F25B 2700/171* (2013.01); *F25B 2700/2104* (2013.01); *F25B 2700/2106* (2013.01); *F25B 2700/21152* (2013.01)

(58) Field of Classification Search
CPC .............. F25B 49/022; F25B 2309/004; F25B 2341/063; F25B 2341/065; F25B 2341/0662; F25B 2600/01; F25B 2600/0253; F25B 2600/2513; F25B 2700/171; F25B 2700/2104; F25B 2700/2106; F25B 2700/21152
See application file for complete search history.

(56) References Cited

U.S. PATENT DOCUMENTS

| | | | |
|---|---|---|---|
| 5,628,201 A | | 5/1997 | Bahel et al. |
| 5,711,159 A | * | 1/1998 | Whipple, III ......... F25D 17/065 62/186 |
| 6,505,476 B1 | * | 1/2003 | Nishida ................... F25B 9/008 62/210 |
| 7,337,625 B1 | * | 3/2008 | Cowans ................ F25B 41/062 62/210 |
| 9,541,318 B2 | * | 1/2017 | Matsuo ............... F04D 27/0246 |
| 2009/0090118 A1 | * | 4/2009 | Pham ................... F04C 18/0215 62/228.5 |
| 2010/0193156 A1 | | 8/2010 | Nakatani et al. |
| 2010/0199712 A1 | * | 8/2010 | Lifson ..................... F25B 41/04 62/498 |
| 2012/0006525 A1 | * | 1/2012 | Lafleur ............... G05D 23/1902 165/238 |
| 2013/0160474 A1 | * | 6/2013 | Qu .......................... G05D 27/02 62/222 |
| 2017/0198943 A1 | * | 7/2017 | Oka ........................ F25B 49/02 |
| 2018/0023835 A1 | * | 1/2018 | Ooura ..................... F16K 37/00 165/288 |
| 2018/0031292 A1 | * | 2/2018 | Liu ....................... F25B 49/027 |
| 2019/0376727 A1 | * | 12/2019 | Tamura ..................... F25B 5/02 |

FOREIGN PATENT DOCUMENTS

| | | |
|---|---|---|
| JP | 2003-156260 | 5/2003 |
| JP | 2012-149857 | 8/2012 |
| JP | 2014-214964 | 11/2014 |
| JP | 5744219 | 7/2015 |
| JP | 2016-510392 | 4/2016 |
| KR | 10-0461653 | 12/2004 |

OTHER PUBLICATIONS

Extended European Search Report dated Apr. 29, 2020 in European Patent Application No. 18810422.8.

* cited by examiner

AIR CONDITIONER AND METHOD FOR CONTROLLING THE SAME

CROSS-REFERENCE TO RELATED APPLICATION

This application is based on and claims priority under 35 U.S.C. § 119 to Korean Patent Application No. 10-2017-0067794, filed on May 31, 2017 in the Korean Intellectual Property Office, the disclosure of which is incorporated by reference in its entirety.

BACKGROUND

1. Field

Embodiments of the present disclosure relate to a multi-stage expansion-type air conditioner and a method for controlling the same.

2. Description of the Related Art

An air conditioner includes an outdoor unit to perform heat exchange between outdoor air and refrigerant and an indoor unit to perform heat exchange between indoor air and refrigerant. The air conditioner is an apparatus that cools or heats indoor air using movement of heat generated during evaporation and condensation of refrigerant that circulates in a refrigerant cycle including a compressor, a condenser, an expansion device, and an evaporator.

As a representative refrigerant for supplying heat energy of indoor air to an outdoor space or supplying heat energy of outdoor air to an indoor space using the above-mentioned air conditioner, a ChloroFluoroCarbon (CFC) based refrigerant which is well known as Freon gas was used.

However, since CFC-based refrigerants are a main cause of ozone depletion in the stratosphere, the use of CFC-based refrigerants has been completely prohibited worldwide, such that HydroChloroFluoroCarbon (HCFC)-based refrigerants were used as alternative refrigerants.

In recent times, as the standard for refrigerant regulations has been changed from Ozone Depletion Potential (ODP) to Global Warming Potential (GWP), HydroFluoroCarbon (HFC)-based refrigerants have recently been used as alternatives to HydroChloroFluoroCarbon (HCFC)-based refrigerants.

The most general refrigerants widely used in household air-conditioners may be HFC-based R410A refrigerants, and constituent elements (e.g., a heat exchanger, a compressor, and an expansion device) needed for an air conditioner based on R410A refrigerants may be optimally designed in consideration of physical properties of the R410A refrigerants.

However, although HFC-based refrigerants are used in the air conditioner, if the HFC-based refrigerants have a high GWP, the high-GWP HFC-based refrigerants cause global warming such that the high-GWP HFC-based refrigerants are normally subject to international regulation. R410A refrigerants have a GWP of 2089, such that application of low-GWP refrigerants is urgently needed. R32 refrigerants, which are based on the HFC, have a GWP of 675 corresponding to about ⅓ of the GWP '2089' of R410A refrigerants, such that R32 refrigerants have been proposed and widely used as alternative refrigerants.

However, assuming that R32 refrigerants are applied to the air conditioner based on R410A refrigerants, refrigerant physical properties needed to decide a refrigerant density and a mass flow rate such as a specific volume, are changed even in the same HFC-based refrigerants are used, such that a flow rate of refrigerant circulating in the cycle is changed and a compression ratio for determining efficiency of evaporation and condensation is also changed. In conclusion, cycle optimization is not achieved such that it becomes difficult to guarantee performance and reliability. In order to implement cycle optimization, design of requisite constituent elements such as a heat exchanger need to be changed, such that new constituent elements need to be developed. Due to the design change of the constituent elements, production costs and consumption time may be greatly increased, resulting in reduction of product competitiveness.

SUMMARY

Therefore, it is an aspect of the present disclosure to provide an air conditioner for optimizing a cycle using a multistage expansion device in which electronic expansion valves, the degree of opening of which can be adjusted, are connected in series even when using R32 refrigerant instead of R410A refrigerant, thus minimizing design modification, and a method for controlling the same.

Additional aspects of the invention will be set forth in part in the description which follows and, in part, will be obvious from the description, or may be learned by practice of the invention.

In accordance with one aspect of the present disclosure, an air conditioner includes: a compressor configured to compress a refrigerant; a flow passage switching valve configured to switch flow of the refrigerant according to at least one of a cooling mode a heating mode; and a multistage expansion device configured to decompress the refrigerant. The compressor is a rotary compressor using the refrigerant as an operating fluid, and the multistage expansion device includes a first expansion valve to decompress a pressure of the refrigerant when the refrigerant is a high-pressure refrigerant and a second expansion valve to decompress the pressure of the refrigerant when the refrigerant is a medium-pressure refrigerant.

The first expansion valve and the second expansion valve may be connected in series so as to implement a 2-stage expansion scheme, and when the refrigerant is R32 refrigerant, may adjust a flow rate and pressure of the R32 refrigerant through change of a degree of opening of the first expansion value and a degree of opening of the second expansion value, respectively.

The compressor may be a revolutions per minute (RPM) variable type compressor having changeable capacity.

The air conditioner may further include a controller configured to control the degree of opening of the first expansion valve and the degree of opening of the second expansion valve, respectively, so as to acquire an optimum compression ratio in all load regions of the cooling mode and the heating mode.

The air conditioner may further include: an outdoor-temperature detector configured to detect an outdoor temperature; and a revolutions per minute (RPM) detector configured to detect revolutions per minute (RPM) of the compressor. The controller selects an initial opening degree of each of the first expansion valve and the second expansion valve in response to the outdoor temperature detected by the outdoor-temperature detector and a compressor RPM detected by the RPM detector.

The air conditioner may further include an indoor-temperature detector configured to detect an indoor temperature. The controller selects the initial opening degree of each of the first expansion valve and the second expansion valve in response to the indoor temperature detected by the indoor-temperature detector, an outdoor temperature detected by the outdoor-temperature detector, and the compressor RPM detected by the RPM detector.

The air conditioner may further include a discharge temperature detector configured to detect a refrigerant temperature at an outlet of the compressor. The controller calculates a target opening degree of the first expansion valve and the second expansion valve, respectively, in response to a compressor discharge temperature detected by the discharge temperature detector and the compressor RPM detected by the RPM detector.

The controller may control the target opening degree of the first expansion valve and the second expansion valve, respectively, by detecting the compressor discharge temperature and the compressor RPM at intervals of a predetermined time.

The air conditioner may further include a detector configured to detect a current opening degree of the first expansion valve and the second expansion valve, respectively. The controller periodically traces and controls the target opening degree of the first expansion valve and the second expansion valve, respectively, in response to the compressor discharge temperature, the compressor RPM, and the current opening degrees of the first expansion valve and the second expansion valve.

The air conditioner may further include an indoor-temperature detector configured to detect the indoor temperature, and an outdoor-temperature detector configured to detect the outdoor temperature. The controller predicts a cooling/heating load in response to the indoor temperature detected by the indoor-temperature detector and the outdoor temperature detected by the outdoor-temperature detector, and controls the degree of opening of the first expansion valve.

The air conditioner may further include a detector configured to detect a current opening degree of the first expansion valve and the second expansion valve, respectively. The controller periodically traces and controls the target opening degree of the first expansion valve in response to the indoor temperature, the outdoor temperature, and the current opening degree of the first expansion valve.

The air conditioner may further include a discharge temperature detector configured to detect a refrigerant temperature at an outlet of the compressor. The controller periodically traces and controls a target opening degree of the second expansion valve in response to a compressor discharge temperature detected by the discharge temperature detector, the compressor RPM, and the current opening degree of the second expansion valve.

In accordance with another aspect of the present disclosure, a method for controlling an air conditioner which includes a compressor to compress a refrigerant, a first expansion valve and a second expansion valve to decompress the refrigerant using a 2-stage expansion scheme, wherein the compressor is a rotary compressor using R32 refrigerant as an operating fluid. The method includes: detecting an outdoor temperature, a revolutions per minute (RPM) of the compressor, and a refrigerant discharge temperature of the compressor; selecting an initial opening degree of the first expansion valve and the second expansion valve, respectively, in response to the detected outdoor temperature and the compressor RPM; calculating a target opening degree of the first expansion valve and the second expansion valve, respectively, in response to the compressor discharge temperature and the compressor RPM; and controlling a degree of opening of the first expansion valve and a degree of opening of the second expansion valve according to the respective calculated target opening degrees of the first expansion valve and the second expansion valve.

The controlling of the degree of opening of the first expansion valve and the degree of opening of the second expansion valve may include controlling the target opening degree of the first expansion valve and the second expansion valve, respectively, by detecting the compressor discharge temperature and the compressor RPM at intervals of a predetermined time.

The method may further include detecting a current opening degree of the first expansion valve and the second expansion valve. The controlling of the degree of opening of the first expansion valve and the degree of opening of second expansion valve may include periodically tracing and controlling the target opening degree of the first expansion valve and the second expansion valve, respectively, in response to the compressor discharge temperature, the compressor RPM, and the respective current opening degree of the first expansion valve and the second expansion valve.

The method may further include detecting the indoor temperature, and predicting a cooling/heating load in response to the indoor temperature, the outdoor temperature, and the current opening degree of the first expansion valve, and periodically tracing and controlling the target opening degree of the first expansion valve.

The method may further include periodically tracing and controlling the target opening degree of the second expansion valve in response to the compressor discharge temperature, the compressor RPM, and the current opening degree of the second expansion valve.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
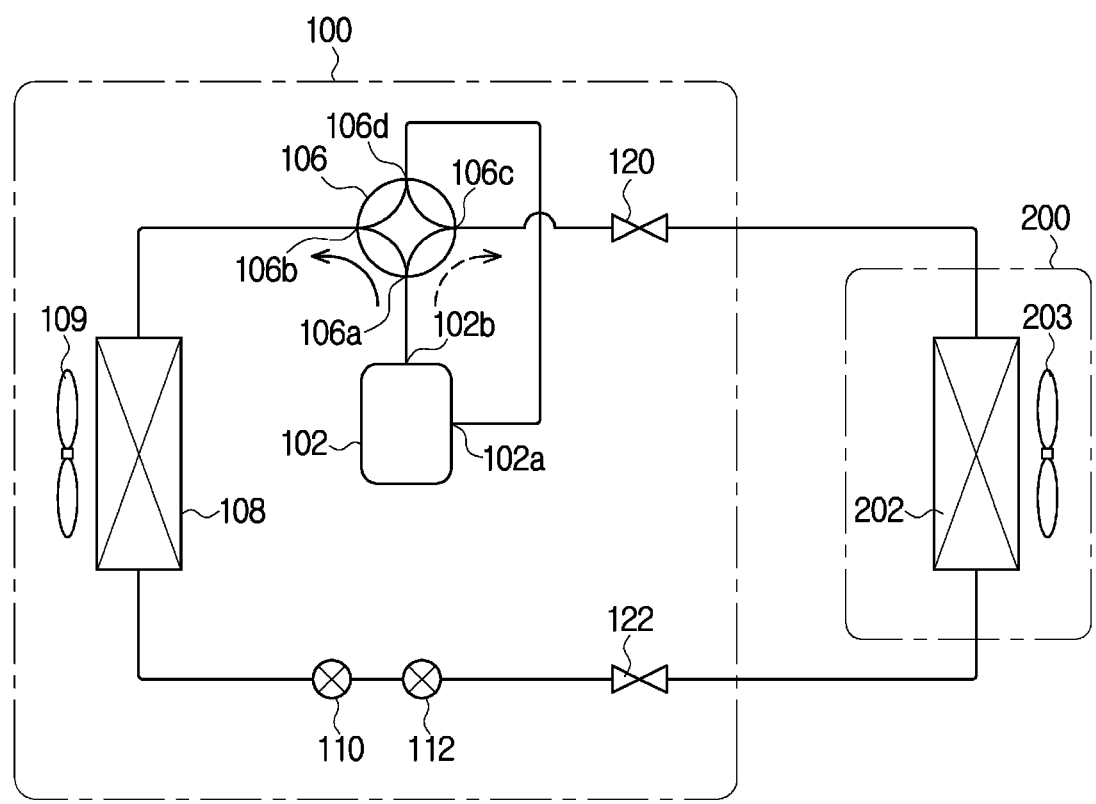
FIG. 1 is a conceptual view illustrating a system of an air conditioner according to an embodiment of the present disclosure.

Reference will now be made in detail to the embodiments of the present disclosure, examples of which are illustrated in the accompanying drawings, wherein like reference numerals refer to like elements throughout.

The terms used in the present application are merely used to describe specific embodiments and are not intended to limit the present disclosure. A singular expression may include a plural expression unless otherwise stated in the context. In the present application, the terms "including" or "having" are used to indicate that features, numbers, steps, operations, components, parts or combinations thereof described in the present specification are present and presence or addition of one or more other features, numbers, steps, operations, components, parts or combinations is not excluded.

In description of the present disclosure, the terms "first" and "second" may be used to describe various components, but the components are not limited by the terms. The terms may be used to distinguish one component from another component. For example, a first component may be called a second component and a second component may be called a first component without departing from the scope of the present disclosure. The term "and/or" may include a combination of a plurality of items or any one of a plurality of items.

FIG. 1 is a conceptual view illustrating a system of an air conditioner according to an embodiment of the present disclosure.

Referring to FIG. 1, the air conditioner 1 may include an outdoor unit 100 to perform heat exchange between outdoor air and refrigerant and an indoor unit 200 to perform heat exchange between indoor air and refrigerant. The indoor unit 200 and the outdoor unit 100 may be coupled to each other through a refrigerant pipe, resulting in formation of a cycle. The outdoor unit 100 may include a high-pressure service valve 120 and a low-pressure service valve 122 that are used to perform coupling of the refrigerant pipe connected to the indoor unit 200.

The outdoor unit 100 may include a compressor 102, a flow passage switching valve 106, an outdoor heat exchanger 108, a first expansion valve 110, and a second expansion valve 112.

The compressor 102 may form high-temperature high-pressure refrigerant by compressing low-temperature low-pressure refrigerant suctioned through an inlet 102a, and may discharge the high-temperature high-pressure refrigerant to the outside through an outlet 102b. The compressor 102 may be constructed as a variable RPM rotary compressor in which compression capacity is changed according to an input frequency. The compressor 102 may be implemented as a low-capacity variable RPM rotary compressor having a displacement of 9~12 cc/rev. The inlet 102a and the outlet 102b of the compressor 102 may be connected to the flow passage switching valve 106.

The flow passage switching valve 106 may be constructed as a 4-way valve to switch flow of refrigerant discharged from the compressor 102 according to an operation mode (cooling or heating), resulting in formation of a refrigerant flow passage needed to perform the corresponding operation mode. The flow passage switching valve 106 may include a first port 106a connected to the outlet 102b of the compressor 100, a second port 106b connected to the outdoor heat exchanger 108, a third port 106c connected to the indoor unit 200, and a fourth port 106d connected to the inlet 102a of the compressor 100.

During the cooling mode, the outdoor heat exchanger 108 may operate as a condenser for condensing a high-temperature high-pressure gaseous refrigerant into a normal-temperature high-pressure liquid refrigerant. During the heating mode, the outdoor heat exchanger 108 may operate as an evaporator for evaporating a low-temperature low-pressure liquid refrigerant into a gaseous refrigerant, such that the outdoor heat exchanger 108 may perform heat exchange with peripheral air in response to change in refrigerant enthalpy. The first expansion valve 110 and the second expansion valve 112 may be connected to one side of the outdoor heat exchanger 108. The outdoor heat exchanger 108 may include an outdoor fan 109 configured to increase the efficiency of heat exchange between refrigerant and outdoor air.

Each of the first expansion valve 110 and the second expansion valve 112 may be implemented as an electronic expansion valve configured to adjust the degree of opening thereof. The first expansion valve 110 and the second expansion valve 112 may expand the refrigerant, may adjust a flow rate of the refrigerant, and may prevent flow of the refrigerant.

The first expansion valve 110 may decompress a high-pressure refrigerant, and the second expansion valve 112 may decompress a medium-pressure refrigerant. Each of the first expansion valve 110 and the second expansion valve 112 may be replaced with the other expansion valve configured to perform the above-mentioned function.

The embodiment of the present disclosure may connect the first expansion valve 110 and the second expansion valve 112 in series so as to implement the multistage expansion scheme, such that the embodiment may acquire an optimum compression ratio in all the cooling/heating load regions. The multistage expansion scheme is configured in a manner that legacy electronic expansion valves are simply connected in series, such that the number of design modifications, such as the design modification of the outdoor heat exchanger 108, as compared to the conventional design may be minimized.

The indoor unit 200 may be an apparatus for cooling/heating indoor air of the indoor space through heat exchange between the refrigerant and the air. The indoor unit 200 may include an indoor heat exchanger 202 and an indoor fan 203. If necessary, two or more indoor units 200 may also be installed.

The indoor heat exchanger 202 may operate as the evaporator in the cooling mode, and may operate as the condenser in the heating mode. The indoor fan 203 may be installed adjacent to the indoor heat exchanger 202, and may circulate indoor air, such that the indoor fan 203 may increase the efficiency of heat exchange between the refrigerant circulating in the indoor heat exchanger 202 and the indoor air.

The refrigerant for transferring indoor heat energy to the outdoor space or transferring outdoor heat energy to the indoor space using the air conditioner 1 will hereinafter be described in detail.

HFC-based R410A refrigerants generally used in most household air conditioners have a high GWP causing global warming, such that the HFC-based R410A refrigerants are normally subject to international regulation. The same HFC-based R32 refrigerants having a low GWP have been increasingly used as alternative refrigerants in associated industries.

Although the above-mentioned two refrigerants (i.e., R410A refrigerant and R32 refrigerant) are the same HFC-based refrigerants, the R32 refrigerant having a low GWP may have a relatively large specific volume and lower density, resulting in reduction of a mass flow rate. However, the R32 refrigerant has superior cooling capability per unit mass, such that it is expected that the R32 refrigerant has 2~3% higher performance as compared to the R410A refrigerant. In contrast, assuming that only the R32 refrigerant is applied to the same system to which the R310A refrigerant has been applied, a mass flow rate is reduced so that the compression ratio for deciding the efficiency of evaporation and condensation is changed. As a result, cycle optimization is not achieved such that it becomes difficult to guarantee optimum performance and reliability.

Reduction in flow rate based on density reduction due to application of R32 refrigerant is considered more significant in a cooling/heating low-load condition rather than in a high-load condition. In the low-load condition, the variable-RPM compressor 102 should have a low RPM, such that the part-load condition may refer to a section in which the compression ratio is gradually reduced. In order to normally perform a refrigerant evaporation process through heat exchange with the air under the corresponding condition, the normal cycle must be achieved by reducing evaporation saturation pressure through reduction of the degree of opening of the expansion valve. In the part-load condition in which the RPM of the compressor 102 is reduced, although the degree of opening of the expansion valve is minimized by reduction of a total flow rate of the system, the compression ratio is not guaranteed, such that it is impossible to guarantee desired performance and reliability. The above-mentioned issues may uniquely occur in low-capacity [9,000~12,000 BTU/h] air conditioners generally used in household appliances.

Therefore, in order to acquire an optimum compression ratio for implementing the optimum cycle during application of the R32 refrigerant, the multistage expansion scheme is implemented instead of the legacy 1-stage expansion scheme, and a normal cycle is implemented in a low-flow-rate condition, such that the performance and reliability can be guaranteed. The above-mentioned multistage expansion scheme is implemented by simply connecting the legacy expansion valves in series, such that the number of design modifications can be minimized as compared to the number of design modifications of the heat exchanger.

Figure 2:
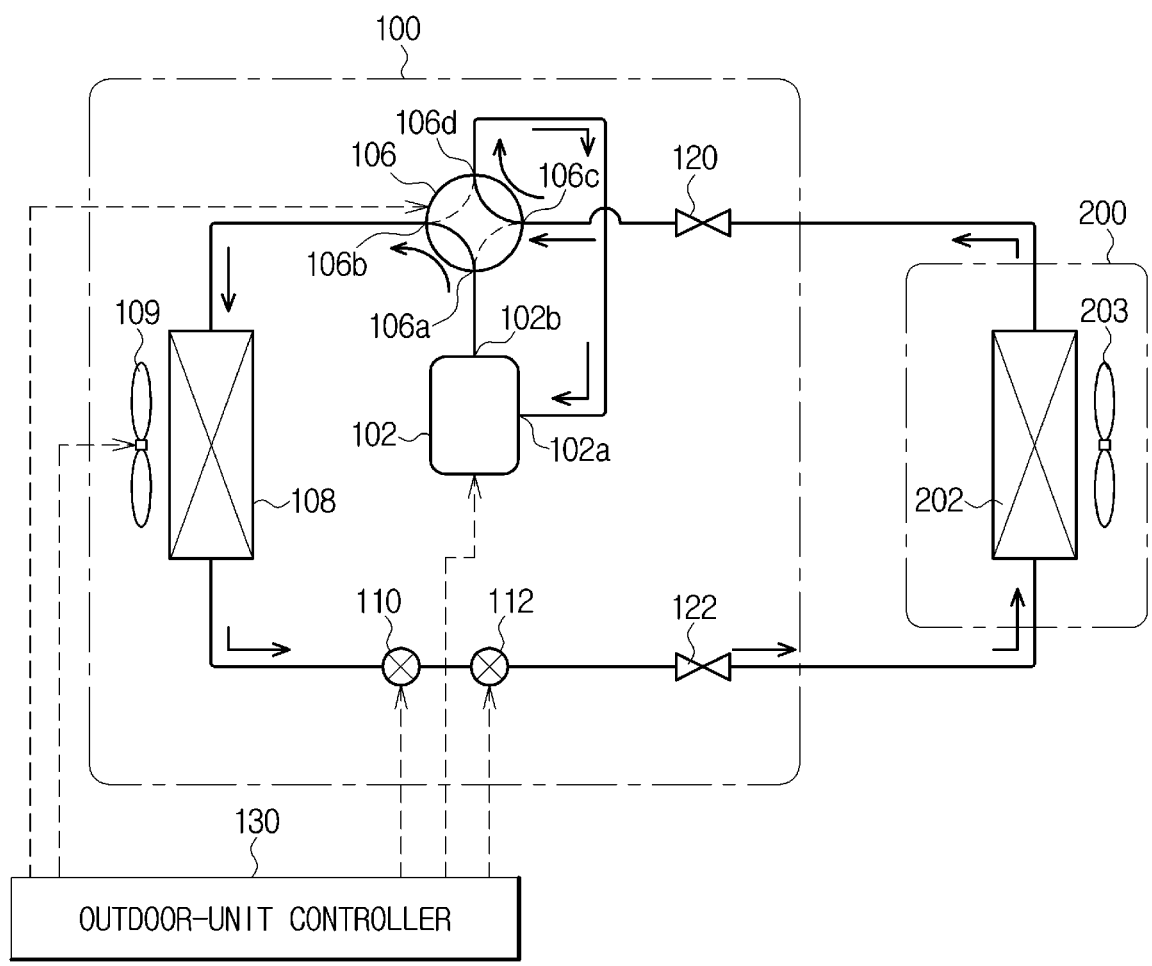
FIG. 2 is a conceptual diagram illustrating a refrigerant cycle during a cooling mode of the air conditioner shown in FIG. 1.

FIG. 2 is a conceptual diagram illustrating a refrigerant cycle during a cooling mode of the air conditioner shown in FIG. 1.

Referring to FIG. 2, an outdoor-unit controller 130 (shown in FIG. 4) may connect the first port 106a to the second port 106b by operating the flow passage switching valve 106, and may form a refrigerant flow passage connected to the third port 106c and the fourth port 106d.

The outdoor-unit controller 130 may open the first expansion valve 110 and the second expansion valve 112, and may thus control the refrigerant to flow into the indoor unit 200.

Therefore, the refrigerant discharged from the compressor 102 may flow into the indoor unit 200 after passing through the flow passage switching valve 106 and the outdoor heat exchanger 108. In this case, the outdoor heat exchanger 108 may operate as the condenser.

The refrigerant flowing in the indoor unit 200 may be suctioned into the compressor 102 after sequentially passing through the indoor heat exchanger 202 and the flow passage switching valve 106. In this case, the indoor heat exchanger 202 may operate as the evaporator.

Therefore, the air conditioner 1 may construct the refrigerant cycle in which the refrigerant circulates in the order of the compressor 102→the flow passage switching valve 106→the outdoor heat exchanger 108→the first expansion valve 110→the second expansion valve 112→the indoor heat exchanger 202→the flow passage switching valve 106→the compressor 102, resulting in implementation of the cooling mode of the indoor unit 200.

Figure 3:
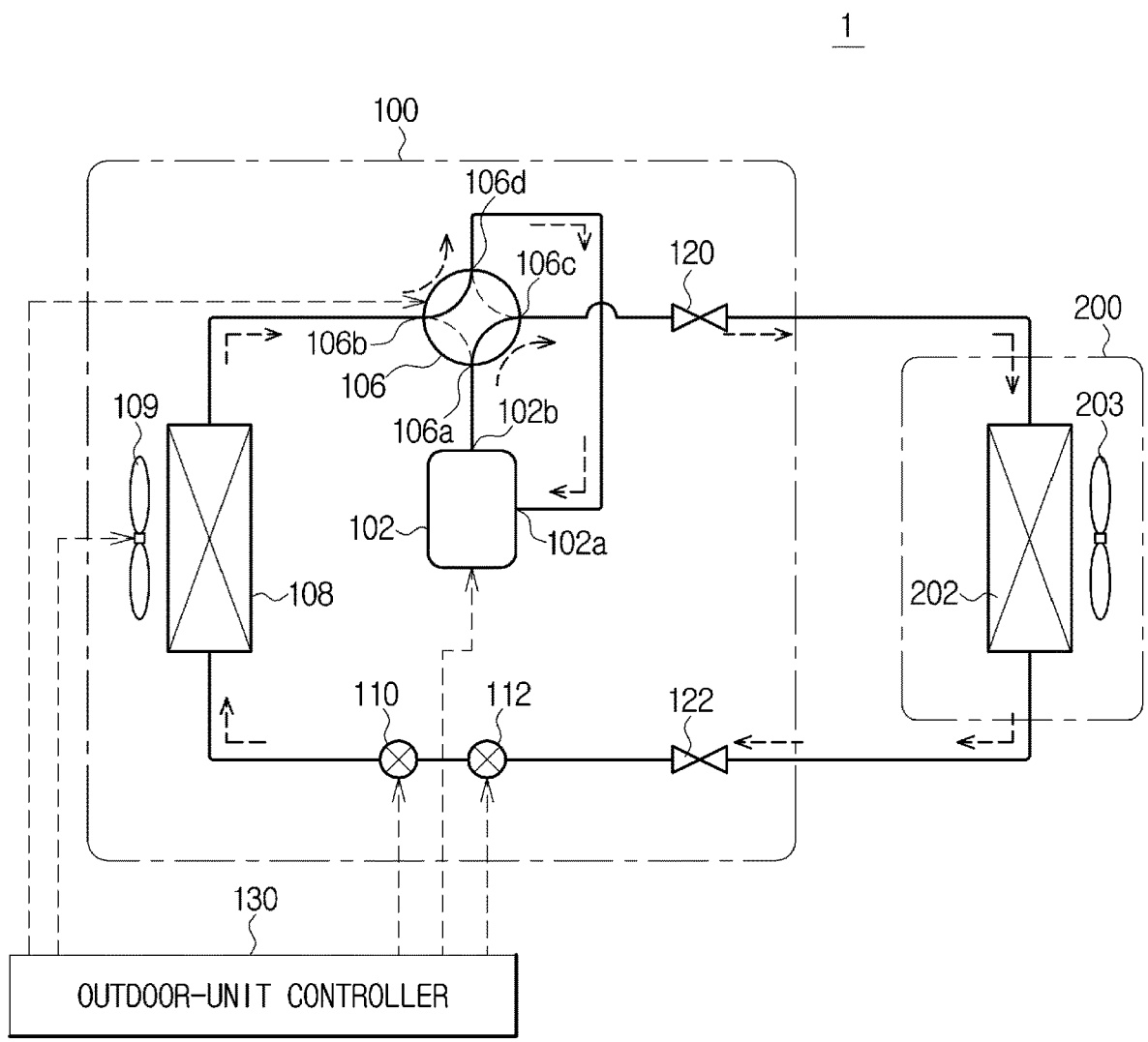
FIG. 3 is a conceptual diagram illustrating a refrigerant cycle during a heating mode of the air conditioner shown in FIG. 1.

FIG. 3 is a conceptual diagram illustrating a refrigerant cycle during the heating mode of the air conditioner shown in FIG. 1.

Referring to FIG. 3, the outdoor-unit controller 130 (shown in FIG. 4) may connect the first port 106a to the third port 106c by operating the flow passage switching valve 106, and may form a refrigerant flow passage connected to the second port 106b and the fourth port 106d.

The outdoor-unit controller 130 may open the first expansion valve 110 and the second expansion valve 112, and may thus control the refrigerant to flow in the indoor unit 200.

Therefore, the refrigerant discharged from the compressor 102 may flow in the indoor unit 200 after passing through the flow passage switching valve 106.

The refrigerant flowing in the indoor unit 200 may flow into the outdoor heat exchanger 108 after passing through the outdoor heat exchanger 202. In this case, the indoor heat exchanger 202 may operate as the condenser, and the outdoor heat exchanger 108 may operate as the evaporator. The refrigerant flowing in the outdoor heat exchanger 108 may be suctioned into the compressor 102 after passing through the flow passage switching valve 106.

Therefore, the air conditioner 1 may construct the refrigerant cycle in which the refrigerant circulates in the order of the compressor 102→the flow passage switching valve 106→the indoor heat exchanger 202→the second expansion valve 112→the first expansion valve 110→the outdoor heat exchanger 108→the flow passage switching valve 106→the compressor 102, resulting in implementation of the heating mode of the indoor unit 200.

Figure 4:
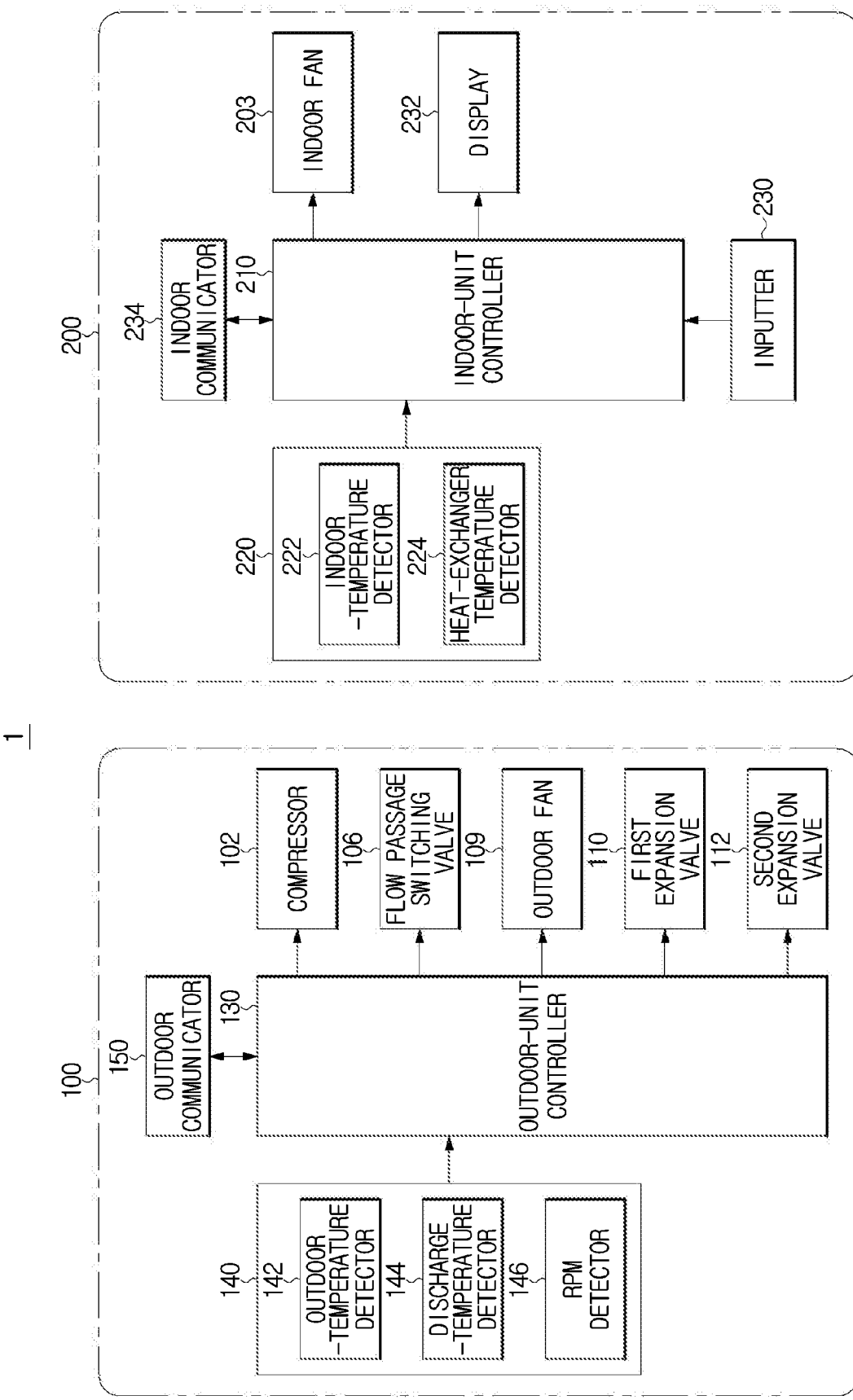
FIG. 4 is a block diagram illustrating a control system of the air conditioner shown in FIG. 1.

FIG. 4 is a block diagram illustrating a control system of the air conditioner shown in FIG. 1.

Referring to FIG. 4, the outdoor unit 100 of the air conditioner 1 may include not only the constituent elements shown in FIG. 1, but also the outdoor-unit controller 130, a detector 140, and an outdoor communicator 150.

The outdoor-unit controller 130 may be a microprocessor for controlling overall operation of the outdoor unit 100. The outdoor-unit controller 130 may receive various kinds of information needed to operate the outdoor unit 100 from the detector 140, and may control the compressor 102, the flow passage switching valve 106, the first expansion valve 110, and the second expansion valve 112 on the basis of the received information.

The outdoor-unit controller 130 may include a memory in which the initial opening degree of each of the first expansion valve 110 and the second expansion valve 112 according to outdoor air ($T_o$) and a compressor RPM ($C_f$) is preset.

The detector 140 may detect various kinds of information needed to operate the outdoor unit 100 from sensors mounted to the outdoor unit 100, may output the detected information to the outdoor-unit controller 130, and may include an outdoor-temperature detector 142, a discharge-temperature detector 144, and a RPM detector 146.

The outdoor-temperature detector 142 may detect a temperature ($T_o$) of the outdoor space including the outdoor unit 100, and may output the detected temperature ($T_o$) to the outdoor-unit controller 130.

The discharge-temperature detector 144 may detect a refrigerant temperature ($T_d$) of the outlet 102b of the compressor 102, and may output the detected refrigerant temperature ($T_d$) to the outdoor-unit controller 130.

The RPM detector 146 may detect the RPM ($C_f$) of the compressor 102, and may output the detected RPM ($C_f$) of the compressor 102 to the controller 130.

The outdoor communicator 150 may be connected to the outdoor-unit controller 130, and may communicate with the indoor unit 200.

The indoor unit 200 of the air conditioner 1 may include not only the constituent elements shown in FIG. 1, but also an indoor-unit controller 210, a detector 220, an inputter 230, a display 232, and an indoor communicator 234.

The indoor-unit controller 210 may be a microprocessor for controlling overall operation of the indoor unit 200. The indoor-unit controller 210 may receive various kinds of information needed to operate the indoor unit 200 from the detector 220, and may control the indoor unit 200 on the basis of the received information.

The detector 220 may detect various kinds of information needed to operate the indoor unit 200 from sensors mounted to the indoor unit 200, may output the detected information to the indoor-unit controller 210, and may include an indoor-temperature detector 222 and a heat-exchanger temperature detector 224.

The indoor-temperature detector 222 may detect a temperature ($T_r$) of the indoor space including the indoor unit 200, and may output the detected temperature ($T_r$) to the indoor-unit controller 210.

The heat-exchanger temperature detector 224 may detect a temperature of the indoor heat-exchanger 202, and may output the detected temperature to the indoor-unit controller 210.

The inputter 230 may be a remote control device for wirelessly transmitting a control command for selecting an operation of the indoor unit 200, and may select any one of the cooling mode and the heating mode.

The inputter 230 may include a mobile phone (e.g., a cellular phone or a PCS phone), a smartphone, a personal digital assistant (PDA), a Portable Multimedia Player (PMP), a laptop computer, a digital broadcasting terminal, a netbook, a tablet PC, a navigation system, etc.

In addition, the inputter 230 may be a general simplified remote-controller. The remote-controller may generally communicate with the indoor unit 200 using infrared Data Association (IrDA).

The inputter 230 may transmit and receive radio frequency (RF) signals to and from the indoor unit 200 using various communication schemes, for example, Radio Frequency (RF), Wi-Fi, Bluetooth, ZigBee), Near Field Communication (NFC), Ultra Wide Band (UWB), etc. It should be noted that any one of the above communication schemes through which the inputter 216 transmits and receives RF signals to and from the indoor unit 200 through wireless communication can be applied to the present disclosure without departing from the scope or spirit of the present disclosure.

The inputter 230 may include an operation/stop button to turn on or off the indoor unit 200, an operation selection button to select an operation mode of the indoor unit 200, a wind-direction button to control the direction of airflow, an air-volume button to control the intensity of airflow, a temperature button to adjust a temperature, a dial button, etc.

Therefore, the air conditioner 1 according to the embodiment may perform the heating mode or the cooling mode according to a mode selection command of the inputter 230.

The display 232 may display operation states of the indoor unit 200 according to a control signal of the indoor-unit controller 210.

The indoor communicator 234 may be connected to the indoor-unit controller 210, and may communicate with the outdoor unit 100.

The outdoor-unit controller 130 and the indoor-unit controller 210 may be connected to a power supply (not shown), and may receive a power source from the power supply (not shown).

The outdoor-unit controller 130 and the indoor-unit controller 210 may be integrated into one body, and may thus control the indoor-unit controller 210.

Figure 5:
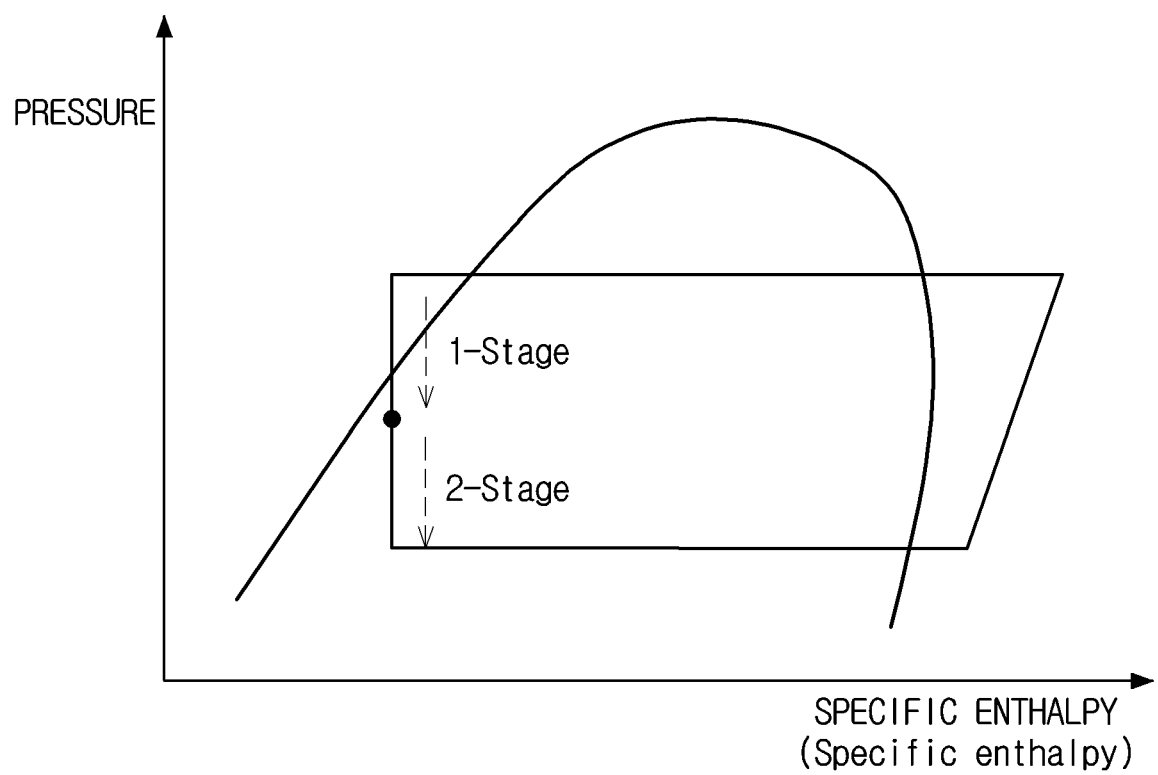
FIG. 5 is a graph illustrating a 2-stage expansion process based on two expansion valves for use in a P-H diagram of the air conditioner according to an embodiment of the present disclosure.

FIG. 5 is a graph illustrating a 2-stage expansion process based on two expansion valves for use in a P-H diagram of the air conditioner according to an embodiment of the present disclosure.

Referring to FIG. 5, during the cooling mode, the first expansion valve 110 may decompress a supercooled refrigerant generated from an outlet of the condenser (i.e., the outdoor heat-exchanger) to a two-phase region in which gaseous refrigerant and liquid refrigerant are mixed with each other, and the second expansion valve 112 may decompress a two-phase refrigerant having medium pressure to an evaporation pressure after the two-phase refrigerant has passed through the first expansion valve 110.

In contrast, during the heating mode, the first expansion valve 110 may operate as the second expansion valve 112, and the second expansion valve 112 may operate as the first expansion valve 110.

As described above, the air conditioner according to the present disclosure may determine a medium-pressure point by adjusting the degree of opening of the first expansion valve 110, and may determine an evaporation pressure by adjusting the degree of opening of the second expansion valve 112, such that the air conditioner may control the compression ratio.

In addition, large pressure drop may occur in the second expansion valve 112 in which refrigerant expansion begins in a two-phase condition. Therefore, even in a low-load condition having a low mass flow rate, refrigerant may be expanded to a target evaporation pressure after passing through the second expansion valve 112, such that a desired compression ratio can be guaranteed under all conditions, resulting in implementation of performance and reliability. Although R32 refrigerant having a low mass flow rate is used in the air conditioner by a difference in refrigerant physical properties using the above-mentioned principles, the cycle can be optimized without modification of the design such as important constituent elements such as the heat exchanger 108 or 202. If the optimum compression ratio is not guaranteed in the air conditioner 1, sensible heat capability of the air is reduced, and a specific enthalpy (i.e., enthalpy per unit mass) of the refrigerant is reduced, resulting in reduction of the cooling/heating capability. In terms of reliability, the degree of superheat is not guaranteed in the inlet 102 of the compressor 102, such that the possibility of liquid compression may increase and the reliability problem may occur.

Figure 6:
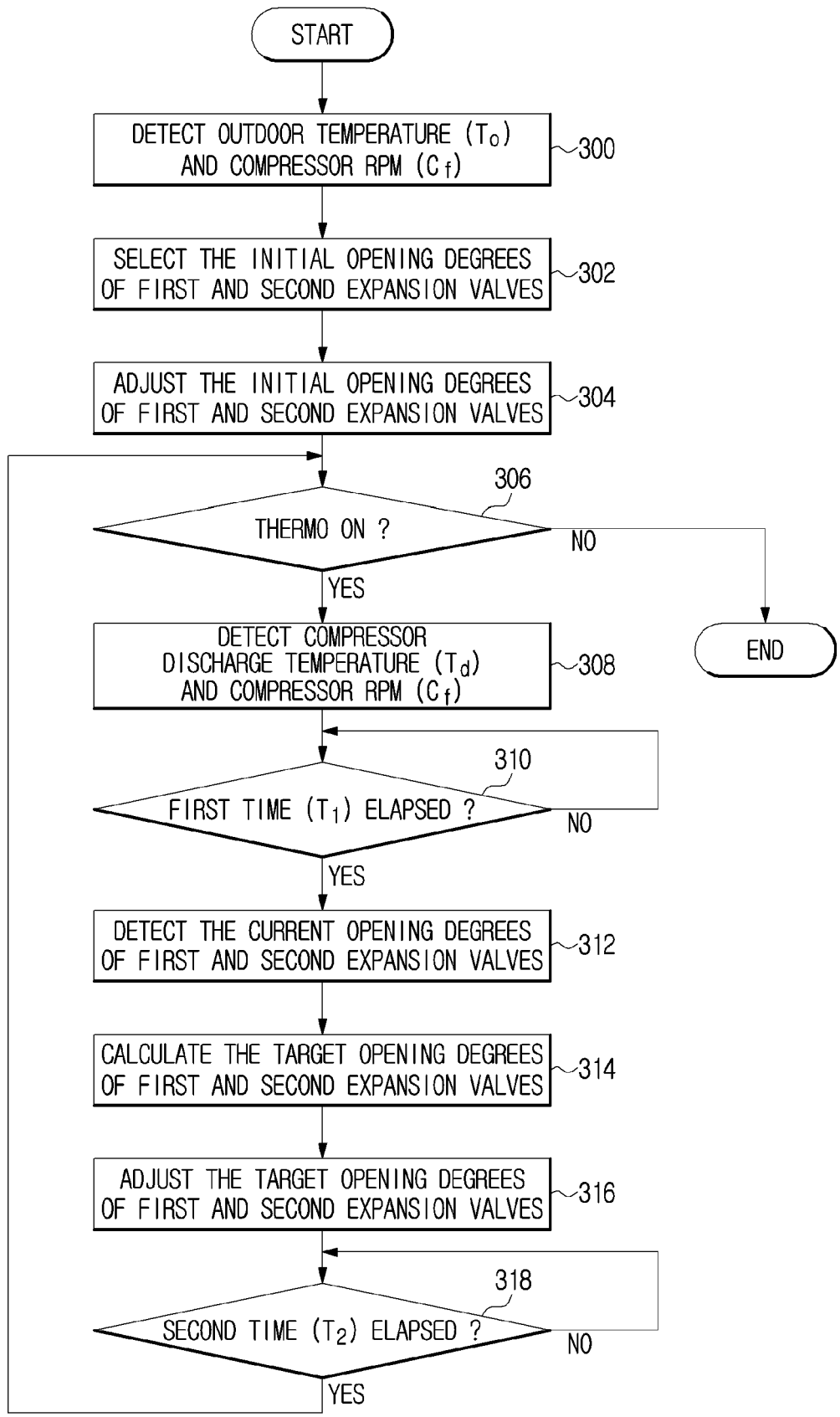
FIG. 6 is a flowchart illustrating a first control algorithm based on a multistage expansion scheme for use in the air conditioner according to an embodiment of the present disclosure.
Figure 7:
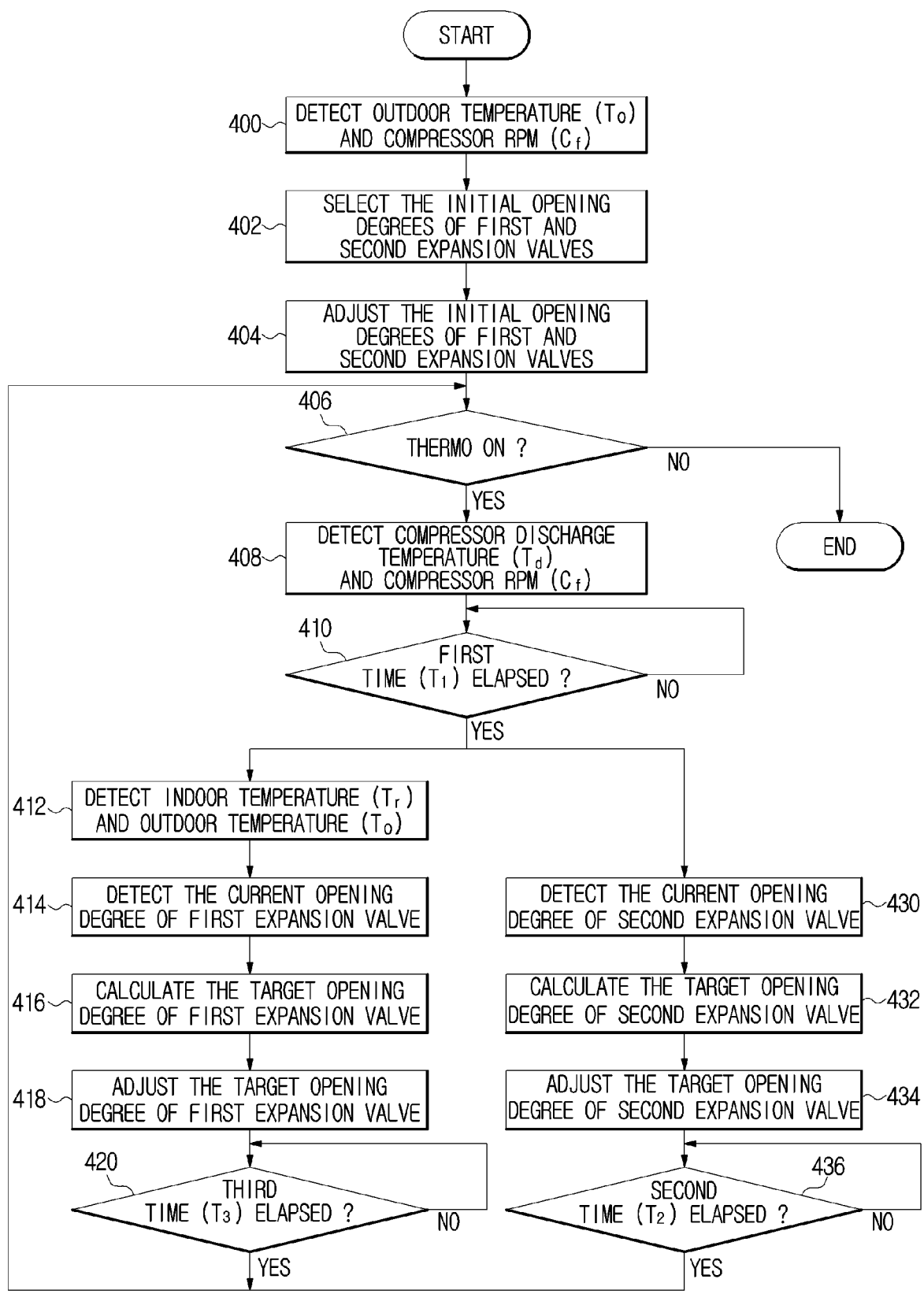
FIG. 7 is a flowchart illustrating a second control algorithm based on a multistage expansion scheme for use in the air conditioner according to an embodiment of the present disclosure.
Figure 8:
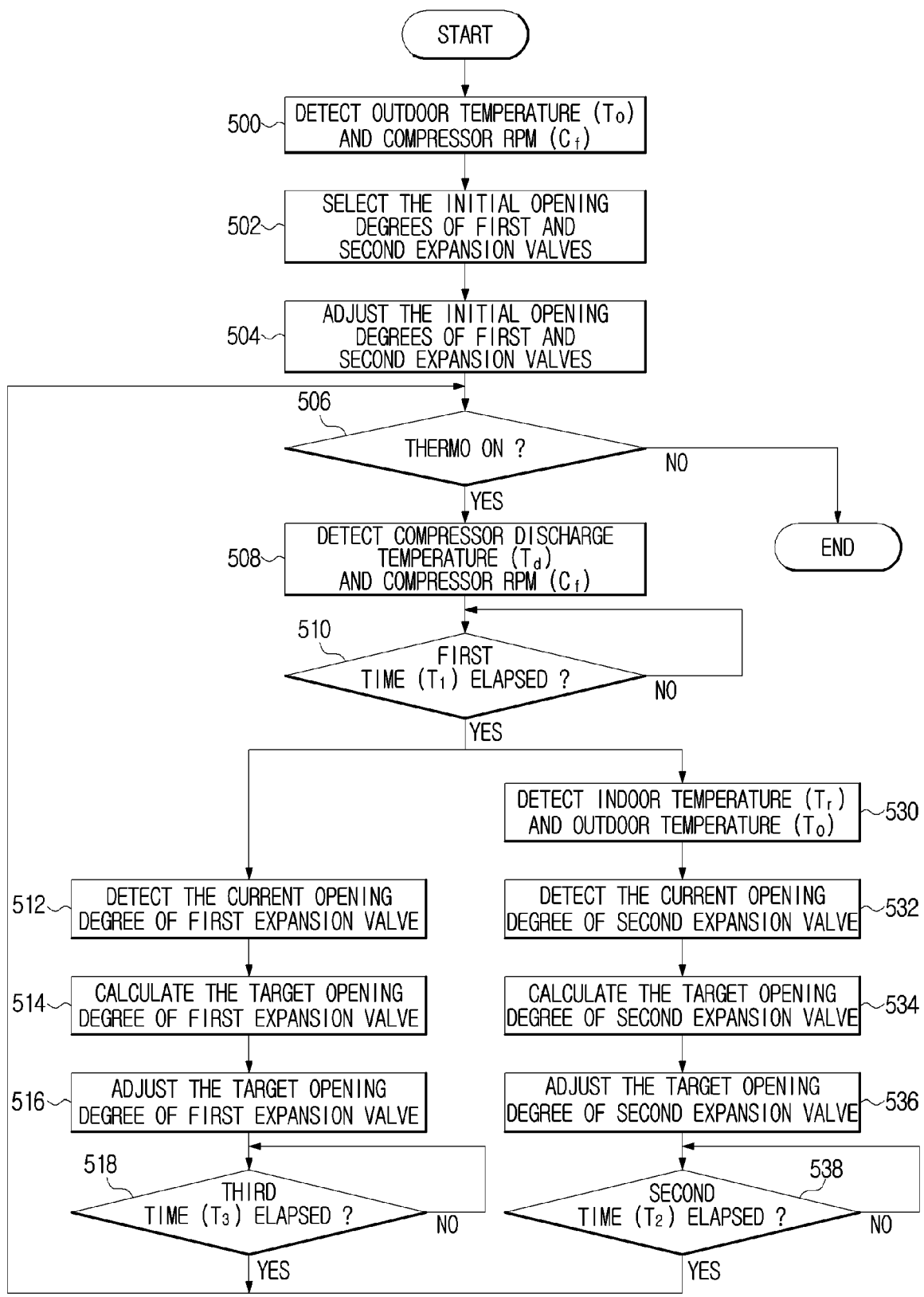
FIG. 8 is a flowchart illustrating a third control algorithm based on a multistage expansion scheme for use in the air conditioner according to an embodiment of the present disclosure.

Although refrigerants having different physical properties are used in the multistage expansion scheme in which the first expansion valve 110 and the second expansion valve 112 of the air conditioner 1 are connected in series, a method for changing the degree of opening of each of the first and second expansion valves 110 and 112 according to indoor/outdoor load conditions in a manner that the flow rate and the compression rate can be optimally adjusted will hereinafter be described with reference to FIGS. 6 to 8. In FIGS. 6 to 8, the operation mode of the air conditioner 1 will hereinafter be described centering upon the cooling mode.

FIG. 6 is a flowchart illustrating a first control algorithm based on a multistage expansion scheme for use in the air conditioner according to an embodiment of the present disclosure.

The first control algorithm shown in FIG. 6 will disclose a method for controlling the degree of opening of each of the first and second expansion valves 110 and 112 according to the outdoor/indoor load conditions in such a manner that the flow rate and the compression rate can be optimally adjusted although refrigerants having different physical properties are used using the multistage expansion scheme in which the first expansion valve 110 and the second expansion valve 112 are connected in series. The operation mode of the air conditioner 1 according to the embodiment of the present disclosure will hereinafter be described centering upon the cooling mode.

Referring to FIG. 6, if a user selects a desired operation mode (e.g., the cooling mode) through the inputter 230, the selected cooling mode information may be input to the indoor-unit controller 210. In this case, the user may input a desired set temperature $(T_s)$ through the inputter 230.

Therefore, the indoor-unit controller 210 may operate the indoor fan 203 according to the user-selected cooling mode information.

Subsequently, the indoor-unit controller 210 may communicate with the outdoor communicator 150 of the outdoor unit 100 through the indoor communicator 234, and the outdoor-unit controller 130 may receive the user-selected cooling mode information from the indoor-unit controller 210, such that the indoor-unit controller 210 may sequentially operate the outdoor fan 109 and the compressor 102.

The outdoor-unit controller 130 may operate the flow passage switching valve 106 according to the user-selected cooling mode information, and may control the refrigerant to circulate in the cycle shown in FIG. 2, such that the cooling mode starts operation.

If the cooling mode begins, the outdoor-temperature detector 142 may detect the temperature $(T_o)$ of the outdoor space including the outdoor unit 100, and may output the detected temperature $(T_o)$ to the outdoor-unit controller 130. The RPM detector 146 may detect the RPM $(C_f)$ of the compressor 102, and may output the detected RPM $(C_f)$ of the outdoor-unit controller 130 (300).

Therefore, the outdoor-unit controller 130 may select the initial opening degree of each of the first expansion valve 110 and the second expansion valve 112 not only using the outdoor temperature $(T_o)$ detected by the outdoor-temperature detector 142, but also using the compressor RPM $(C_f)$ detected by the RPM detector 146 (302).

Since the initial opening degree of the first expansion valve 110 and the initial opening degree of the second expansion valve 112 are preset in the outdoor-unit controller 130 according to the outdoor temperature $(T_o)$ and the compressor RPM $(C_f)$, the outdoor-unit controller 130 may select the initial opening degree of the first expansion valve 110 and the initial opening degree of the second expansion valve 112 according to the outdoor temperature $(T_o)$ detected by the outdoor-temperature detector 142 and the compressor RPM $(C_f)$ detected by the RPM detector 146.

If necessary, the outdoor-unit controller 130 may also select the initial opening degree of each of the first and second expansion valves 110 and 112 using three detection values, i.e., the indoor temperature $(T_r)$, the outdoor temperature $(T_o)$, and the compressor RPM $(C_f)$.

Subsequently, the outdoor-unit controller 130 may open or close the first expansion valve 110 and the second expansion valve 112 using the selected initial opening degree, such that the outdoor-unit controller 130 may adjust the first expansion valve 110 and the second expansion valve 112 using the initial opening degree (304).

If the initial opening degree of each of the first and second expansion valves 110 and 112 is completely controlled, the outdoor-unit controller 130 may determine whether a thermo-ON condition is provided (306).

The thermo-ON condition may refer to a process for determining a startup condition of the compressor 102 by comparing a temperature (i.e., the indoor temperature $T_r$) of the indoor space including the indoor unit 200 with the set temperature $(T_s)$. For example, if the indoor temperature $(T_r)$ does not reach the set temperature $(T_s)$, it is necessary for the compressor 102 to be continuously turned on, such that this condition will hereinafter be referred to as a thermo-ON condition. If the indoor temperature $(T_r)$ reaches the set temperature $(T_s)$, it is necessary for the compressor 102 to be turned off, such that this condition will hereinafter be referred to as a thermo-OFF condition.

If the thermo-ON condition is not provided (306), the outdoor-unit controller 130 may determine that the thermo-OFF condition in which the indoor temperature $(T_r)$ reaches the set temperature $(T_o)$ has been provided, such that the air conditioner 1 stops operation.

If the thermo-ON condition is provided (306), the outdoor-unit controller 130 may detect a refrigerant temperature $(T_d)$ at the outlet 102b of the compressor 102 through the discharge temperature detector 144, and may detect the RPM $(C_f)$ of the compressor 102 through the RPM detector 146 (308).

Subsequently, the outdoor-unit controller 130 may determine whether a first time $(t_1)$ (for example, several milliseconds (ms), corresponding to a sensing period for detecting the compressor discharge temperature $T_d$ and the compressor RPM $C_f$), has elapsed (310).

The discharge temperature detector 144 may repeatedly detect, in real time, the refrigerant temperature $(T_d)$ at the outlet 102b of the compressor 102 at intervals of the sensing period $(t_1)$, and may output the detected refrigerant temperature $(T_d)$ to the outdoor-unit controller 130. The RPM detector 146 may repeatedly detect, in real time, the RPM $(C_f)$ of the compressor 102 at intervals of the sensing period $(t_1)$, and may output the detected RPM $(C_f)$ of the compressor 102 to the outdoor-unit controller 130 (308). The outdoor-unit controller 130 may store not only the compressor discharge temperature $(T_d)$ detected at intervals of the sensing period $(t_1)$, but also the compressor RPM $(C_f)$.

If the first time $(t_1)$ has elapsed (310), the outdoor-unit controller 130 may detect the degree of current opening of each of the first expansion valve 110 and the second expansion valve 112 (312).

The outdoor-unit controller 130 may compare the previously-stored compressor discharge temperature $(T_d)$ and the previously-stored compressor RPM $(C_f)$ with the current compressor discharge temperature $(T_d)$ and the current compressor RPM $(C_f)$, such that the outdoor-unit controller 130 may determine the opened or closed state on the basis of the current opening degree of each of the first and second expansion valves 110 and 112, and may calculate a target degree of opening of each of the first and second expansion valves 110 and 112 (314).

The compressor discharge temperature ($T_d$) is a significant factor for deciding a specific enthalpy in the cooling/heating cycles, and the compressor RPM ($C_f$) is a significant factor for changing the specific enthalpy and the flow rate. Therefore, the target opening degree of the first expansion valve 110 and the target opening degree of the second expansion valve 112 may be calculated using two factors, resulting in decision of the 2-stage expansion degree.

Therefore, the outdoor-unit controller 130 may open or close the first expansion valve 110 and the second expansion valve 112 by the calculated target opening degree, such that the first expansion valve 110 and the second expansion valve 112 can be adjusted using the target opening degree (316).

In this case, the first expansion valve 110 and the second expansion valve 112 may be controlled to follow the same opening degree calculated at the same time point. That is, the multistage expansion scheme according to the present disclosure may be controlled in a manner that the first expansion valve 110 and the second expansion valve 112 can always maintain the same opening degree.

Subsequently, the outdoor-unit controller 130 may determine whether a second time ($t_2$) (for example, about 1~2 minutes, corresponding to the opening degree control period in which the degree of opening of each of the first expansion valve and the second expansion valve is changed to optimize the cycle changed according to the outdoor/indoor load conditions), has elapsed (318).

If the second time ($t_2$) has elapsed (318), the outdoor-unit controller 130 may feed back to operation 306, may determine that the thermo-ON condition for determining whether the compressor 102 starts operation is provided, may re-detect the compressor discharge temperature ($T_d$) and the compressor RPM ($C_f$), and may repeatedly perform subsequent processes at intervals of a predetermined time.

FIG. 7 is a flowchart illustrating a second control algorithm based on a multistage expansion scheme for use in the air conditioner according to an embodiment of the present disclosure.

Referring to FIG. 7, if the user selects a desired operation mode (e.g., the cooling mode) through the inputter 230, the selected cooling mode information may be input to the indoor-unit controller 210. In this case, the user may input a desired set temperature ($T_s$) through the inputter 230.

Therefore, the indoor-unit controller 210 may operate the indoor fan 203 according to the user-selected cooling mode information.

Subsequently, the indoor-unit controller 210 may communicate with the outdoor communicator 150 of the outdoor unit 100 through the indoor communicator 234, the outdoor-unit controller 130 may receive the user-selected cooling mode information from the indoor-unit controller 210, and may thus sequentially operate the outdoor fan 109 and the compressor 102.

The outdoor-unit controller 130 may operate the flow passage switching valve 106 according to the user-selected cooling mode information, and may control the refrigerant to circulate in the cycle of FIG. 2, such that the cooling mode may start operation.

If the cooling mode begins, the outdoor-temperature detector 142 may detect the temperature ($T_o$) of the outdoor space including the outdoor unit 100, and may output the detected outdoor temperature ($T_o$) to the outdoor-unit controller 130. The RPM detector 146 may detect the RPM ($C_f$) of the compressor 102, and may thus output the detected RPM ($C_f$) to the outdoor-unit controller 130 (400).

Therefore, the outdoor-unit controller 130 may select the initial opening degree of each of the first expansion valve 110 and the second expansion valve 112 not only using the outdoor temperature ($T_o$) detected by the outdoor-temperature detector 142, but also using the compressor RPM ($C_f$) detected by the RPM detector 146 (402).

Since the initial opening degree of the first expansion valve 110 and the initial opening degree of the second expansion valve 112 are preset in the outdoor-unit controller 130 according to the outdoor temperature ($T_o$) and the compressor RPM ($C_f$), the initial opening degree of the first expansion valve 110 and the initial opening degree of the second expansion valve 112 may be selected according to the outdoor temperature ($T_o$) detected by the outdoor-temperature detector 142 and the compressor RPM ($C_f$) detected by the RPM detector 146.

In addition, the outdoor-unit controller 130 may also select the initial opening degree using three detection values, i.e., the indoor temperature ($T_r$), the outdoor temperature ($T_o$), and the compressor RPM ($C_f$).

Subsequently, the outdoor-unit controller 130 may open or close the first expansion valve 110 and the second expansion valve 112 according to the selected initial opening degree, such that the outdoor-unit controller 130 may control each of the first expansion valve 110 and the second expansion valve 112 using the initial opening degree (404).

If the initial opening degree is completely controlled, the outdoor-unit controller 130 may determine whether the thermo-ON condition is provided (406).

If the thermo-ON condition is not provided (406), the outdoor-unit controller 130 may determine that the thermo-OFF condition in which the indoor temperature ($T_r$) reaches the set temperature ($T_s$) is provided, and may thus stop operation of the air conditioner 1.

If the thermo-ON condition is provided (406), the outdoor-unit controller 130 may detect the refrigerant temperature (Td) at the outlet 102b of the compressor 102 through the discharge temperature detector 144, and may detect the RPM ($C_f$) of the compressor 102 through the RPM detector 146 (408).

Subsequently, the outdoor-unit controller 130 may determine whether the first time ($t_1$) has elapsed (410).

The discharge temperature detector 144 may repeatedly detect, in real time, the refrigerant temperature ($T_d$) at the outlet 102b of the compressor 102 at intervals of the sensing period ($t_1$), and may output the detected refrigerant temperature ($T_d$) to the outdoor-unit controller 130. The RPM detector 146 may repeatedly detect, in real time, the RPM ($C_f$) of the compressor 102 at intervals of the sensing period ($t_1$), and may output the detected RPM ($C_f$) of the compressor 102 to the outdoor-unit controller 130 (308). The outdoor-unit controller 130 may store not only the compressor discharge temperature ($T_d$) detected at intervals of the sensing period ($t_1$), but also the compressor RPM ($C_f$).

If the first time ($t_1$) has elapsed (410), the outdoor-unit controller 130 detects the outdoor temperature ($T_o$) through the outdoor-temperature detector 142 and detects the indoor temperature ($T_r$) through the indoor-temperature detector 222 so as to calculate the target opening degree of the first expansion valve 110 (412). The reason why the outdoor temperature ($T_o$) and the indoor temperature ($T_r$) are detected is to adjust the medium pressure after completion of 1-stage expansion through regulation of the degree of opening of the first expansion valve 110 in consideration of the indoor/outdoor loads. The optimum compression ratio for optimizing the cycle according to the indoor/outdoor loads is changed, such that it is necessary to control the flow rate in consideration of the indoor/outdoor loads through detection of the outdoor temperature ($T_o$) and the indoor temperature ($T_r$).

The outdoor-unit controller 130 may detect a current opening degree of the first expansion valve 110 (414), may determine the opened or closed state of the first expansion valve 110 on the basis of the current opening degree using the detected outdoor temperature ($T_o$) and the indoor temperature ($T_r$), and may calculate the target opening degree of the first expansion valve 110 (416).

Therefore, the outdoor-unit controller 130 may open or close the first expansion valve 110 by the calculated target opening degree, such that the first expansion valve 110 is adjusted using the target opening degree (418).

Subsequently, the outdoor-unit controller 130 may determine whether a third time ($t_3$) (for example, about 1~2 minutes, corresponding to the opening degree control period in which the degree of opening of the first expansion valve is changed to optimize the cycle changed according to the outdoor/indoor load conditions), has elapsed (420).

If the third time ($t_3$) has elapsed (420), the outdoor-unit controller 130 may feed back to operation 406, may determine that the thermo-ON condition for determining whether the compressor 102 starts operation is provided, may re-detect the compressor discharge temperature ($T_d$) and the compressor RPM ($C_f$), and may repeatedly perform subsequent processes at intervals of a predetermined time, such that the degree of opening of the first expansion valve 110 is controlled. In this case, the opening degree change period of the first expansion valve 110 may be changed as necessary.

If the first time ($t_1$) has elapsed (410), the outdoor-unit controller 130 may detect the current opening degree of the second expansion valve 112 (430), may determine the opened or closed state of the second expansion valve 112 on the basis of the current opening degree in consideration of the compressor discharge temperature ($T_d$) and the compressor RPM ($C_f$), and may calculate the target opening degree of the second expansion valve 112 (432).

The compressor discharge temperature ($T_d$) is a significant factor for deciding a specific enthalpy in the cooling/heating cycles, and the compressor RPM ($C_f$) is a significant factor for changing the specific enthalpy and the flow rate. Therefore, the target opening degree of the second expansion valve 112 may be calculated using two factors, resulting in decision of the 2-stage expansion degree.

Therefore, the outdoor-unit controller 130 may open or close the second expansion valve 112 by the calculated target opening degree, and may adjust the second expansion valve 112 using the target opening degree (434).

Subsequently, the indoor-unit controller 130 may determine whether the second time ($t_2$) (for example, about 1~2 minutes, corresponding to the opening degree control period in which the degree of opening of the second expansion valve is changed to optimize the cycle changed according to the outdoor/indoor load conditions), has elapsed (436).

If the second time ($t_2$) has elapsed (436), the outdoor-unit controller 130 may feed back to operation 406, may determine that the thermo-ON condition for determining whether the compressor 102 starts operation is provided, may re-detect the compressor discharge temperature ($T_d$) and the compressor RPM ($C_f$), and may repeatedly perform subsequent processes at intervals of a predetermined time. Accordingly, the degree of opening of the second expansion valve 112 may be controlled. In this case, the opening degree change period of the second expansion valve 112 may be changed as necessary. In this case, in order to control the degree of opening of the second expansion valve 112, the superheat degree of cooling may be calculated by detecting a temperature at each of the inlet and outlet of the evaporator of the indoor-unit heat exchanger 202, a medium temperature of the evaporator, and a temperature at the inlet of the compressor 102, such that the optimum compression ratio can be guaranteed through the scheme for controlling the cooling opening degree needed to estimate a specific superheat degree.

FIG. 8 is a flowchart illustrating a third control algorithm based on a multistage expansion scheme for use in the air conditioner according to an embodiment of the present disclosure.

Referring to FIG. 8, if the user selects a desired operation mode (e.g., the cooling mode) through the inputter 230, the selected cooling mode information is input to the indoor-unit controller 210. In this case, the user may input a desired set temperature ($T_s$) through the inputter 230.

Therefore, the indoor-unit controller 210 may operate the indoor fan 203 according to the user selected cooling mode information.

Subsequently, the indoor-unit controller 210 may communicate with the outdoor communicator 150 of the outdoor unit 100 through the indoor communicator 234, may receive the user-selected cooling mode information from the indoor-unit controller 210, and may sequentially operate the outdoor fan 109 and the compressor 102.

The outdoor-unit controller 130 may operate the flow passage switching valve 106 according to the user-selected cooling mode information, and may control the refrigerant to circulate in the cycle of FIG. 2, thereby starting the cooling mode.

If the cooling mode begins, the outdoor-temperature detector 142 may detect the temperature ($T_o$) of the outdoor space including the outdoor unit 100, and may output the detected temperature ($T_o$) to the outdoor-unit controller 130. The RPM detector 146 may detect the RPM ($C_f$) of the compressor 102, and may thus output the detected RPM ($C_f$) to the outdoor-unit controller 130 (500).

Therefore, the outdoor-unit controller 130 may select the degree of initial opening of each of the first expansion valve 110 and the second expansion valve 112 not only using the outdoor temperature ($T_o$) detected by the outdoor-unit detector 142, but also using the compressor RPM ($C_f$) detected by the RPM detector 146 (502).

Since the initial opening degree of the first expansion valve 110 and the initial opening degree of the second expansion valve 112 are preset in the outdoor-unit controller 130 according to the outdoor temperature ($T_o$) and the compressor RPM ($C_f$), the initial opening degree of the first expansion valve 110 and the initial opening degree of the second expansion valve 112 may be selected according to the outdoor temperature ($T_o$) detected by the outdoor-temperature detector 142 and the compressor RPM ($C_f$) detected by the RPM detector 146.

The outdoor-unit controller 130 may also select the degree of initial opening using three detection values, i.e., the indoor temperature ($T_r$), the outdoor temperature ($T_o$), and the compressor RPM ($C_f$).

Subsequently, the outdoor-unit controller 130 may open or close the first expansion valve 110 and the second expansion valve 112 according to the selected initial opening degree, such that the outdoor-unit controller 130 may adjust the degree of initial opening of each of the first expansion valve 110 and the second expansion valve 112 (504).

If the initial opening degree is completely controlled, the outdoor-unit controller 130 may determine whether the thermo-ON condition is provided (506).

If the thermo-ON condition is not provided (506), the outdoor-unit controller 130 may determine that the thermo-OFF condition in which the indoor temperature ($T_r$) reaches the set temperature ($T_s$) is provided, and may stop operation of the air conditioner 1.

If the thermo-ON condition is provided (506), the outdoor-unit controller 130 may detect the refrigerant temperature ($T_d$) at the outlet 102b of the compressor 102 through the discharge temperature detector 144, and may detect the RPM ($C_f$) of the compressor 102 through the RPM detector 146 (508).

Subsequently, the outdoor-unit controller 130 may determine whether the first time ($t_1$) has elapsed (510).

The discharge temperature detector 144 may repeatedly detect, in real time, the refrigerant temperature ($T_d$) at the outlet 102b of the compressor 102 at intervals of the sensing period ($t_1$), and may output the detected refrigerant temperature ($T_d$) to the outdoor-unit controller 130. The RPM detector 146 may repeatedly detect, in real time, the RPM ($C_f$) of the compressor 102 at intervals of the sensing period ($t_1$), and may output the detected RPM ($C_f$) of the compressor 102 to the outdoor-unit controller 130 (308). The outdoor-unit controller 130 may store not only the compressor discharge temperature ($T_d$) detected at intervals of the sensing period ($t_1$), but also the compressor RPM ($C_f$).

If the first time ($t_1$) has elapsed (510), the outdoor-unit controller 130 may detect the current opening degree of the first expansion valve 110 (512), may determine the opened or closed state of the first expansion valve 110 on the basis of the current opening degree, and may calculate the target opening degree of the first expansion valve 110 (514).

The compressor discharge temperature ($T_d$) is a significant factor for deciding a specific enthalpy in the cooling/heating cycles, and the compressor RPM ($C_f$) is a significant factor for changing the specific enthalpy and the flow rate. Therefore, the target opening degree of the first expansion valve 110 may be calculated using two factors, resulting in decision of the 1-stage expansion degree.

Therefore, the outdoor-unit controller 130 may open or close the first expansion valve 110 by the calculated target opening degree, and may thus control the first expansion valve 110 using the target opening degree (516).

Subsequently, the outdoor-unit controller 130 may determine whether the third time ($t_3$) has elapsed (518).

If the third time ($t_3$) has elapsed (518), the outdoor-unit controller 130 may feed back to operation 506, may determine that the thermo-ON condition for determining whether the compressor 102 starts operation is provided, may re-detect the compressor discharge temperature ($T_d$) and the compressor RPM ($C_f$), and may repeatedly perform subsequent processes at intervals of a predetermined time. Therefore, the degree of opening of the first expansion valve 110 may be controlled. In this case, the opening degree change period of the first expansion valve 110 may be changed as necessary.

If the first time ($t_1$) has elapsed (510), the outdoor-unit controller 130 detects the outdoor temperature ($T_o$) through the outdoor-temperature detector 142 and detects the indoor temperature ($T_r$) through the indoor-temperature detector 222 so as to calculate the target opening degree of the second expansion valve 112 (530). The reason why the outdoor temperature ($T_o$) and the indoor temperature ($T_r$) are detected is to adjust the medium pressure after completion of 2-stage expansion through regulation of the degree of opening of the second expansion valve 112 in consideration of the indoor/outdoor loads. The optimum compression ratio for optimizing the cycle according to the indoor/outdoor loads is changed, such that it is necessary to control the flow rate in consideration of the indoor/outdoor loads through detection of the outdoor temperature ($T_o$) and the indoor temperature ($T_r$).

The outdoor-unit controller 130 may detect the current opening degree of the second expansion valve 112 (532), may determine the opened or closed state of the second expansion valve 112 on the basis of the current opening degree using the detected outdoor temperature ($T_o$) and the indoor temperature ($T_r$), and may calculate the target opening degree of the second expansion valve 112 (534).

Therefore, the outdoor-unit controller 130 may open or close the second expansion valve 112 by the calculated target opening degree, such that the second expansion valve 112 is adjusted using the target opening degree (536).

Subsequently, the outdoor-unit controller 130 may determine whether the second time ($t_2$) has elapsed (538).

If the second time ($t_2$) has elapsed (538), the outdoor-unit controller 130 may feed back to operation 506, may determine that the thermo-ON condition for determining whether the compressor 102 starts operation is provided, may re-detect the compressor discharge temperature ($T_d$) and the compressor RPM ($C_f$), and may repeatedly perform subsequent processes at intervals of a predetermined time, such that the degree of opening of the second expansion valve 112 is controlled. In this case, the opening degree change period of the second expansion valve 112 may be changed as necessary.

Figure 9:
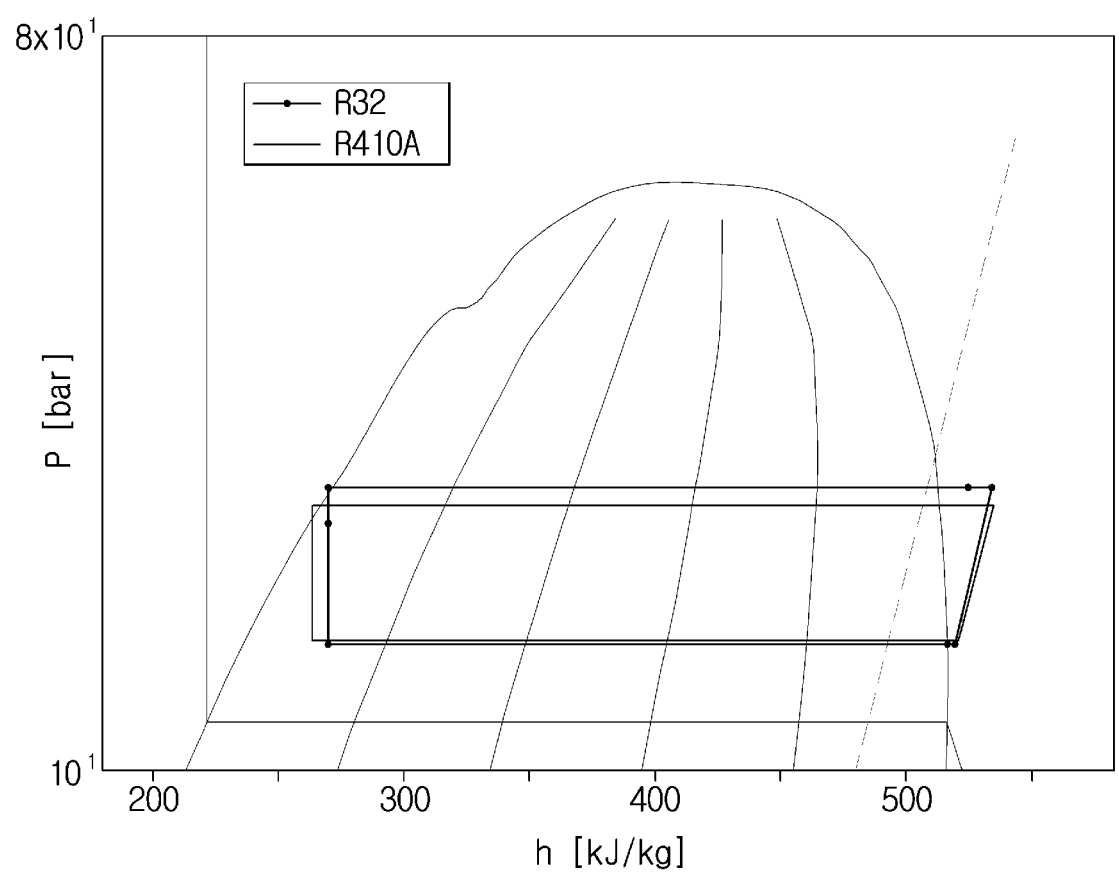
FIG. 9 is a view illustrating the change of a cycle implemented when the multistage expansion based expansion valve is used in the air conditioner after R32 refrigerant is applied to the air conditioner according to an embodiment of the present disclosure.

FIG. 9 is a view illustrating the change of a cycle implemented when the multistage expansion-based expansion valve is used in the air conditioner after R32 refrigerant is applied to the air conditioner according to an embodiment of the present disclosure.

Referring to FIG. 9, when one or two expansion valves are applied to the air conditioner after R32 refrigerant is applied to a part-load condition indicating about the cooling capacity of 3,500 BTU/h, a variation in cycle characteristics according to the change of pressure is shown in the P-H diagram.

The cooling capacity of 3,500 BTU/h may be similar to cooling capacity capable of being obtained when the compressor 102 having capacity of 9~12 cc/rev is driven at a minimum RPM, and the partial load condition may be a significant load region for deciding a seasonal efficiency of the air conditioner 1. The essential constituent elements requisite for the cycle may be similar to the specifications shown in FIG. 1, and only one expansion valve may be identical in structure to the legacy 410A refrigerant application system. When only one expansion valve identical to those of the related art is applied, the compression ratio is set to about 1.4. In contrast, when two expansion valves are used, the compression ratio is set to about 1.6, such that it can be recognized that the compression ratio of the case of using two expansion valves is superior to the compression ratio of the other case of using only one expansion valve by about 15%. After the completion of 1-stage expansion, the refrigerant enters the two-phase region, and then enters the 2-stage expansion process, such that it can be recognized that evaporation pressure is greatly reduced as compared to application of a single expansion valve, and total capability is improved by 10% or higher. The appropriate evaporation pressure can be guaranteed even in the region of 3,500 BTU/h or less, such that it can be recognized that desired performance is guaranteed in the part-load region.

Figure 10:
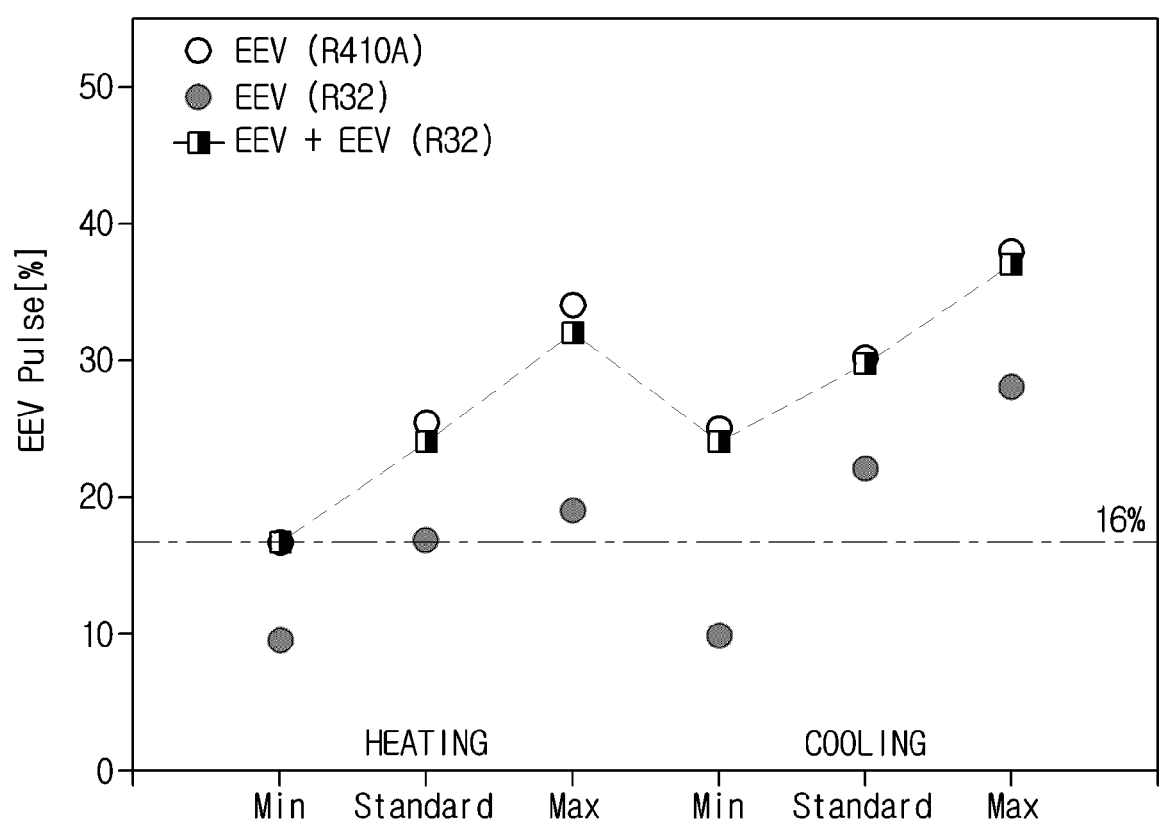
FIG. 10 is a graph illustrating the result of comparison of the opening degree according to the number of expansion valves when a R410A refrigerant and R32 refrigerant are applied in the same system having of predetermined cooling/heating load conditions (minimum/rated/maximum).

FIG. 10 is a graph illustrating the result of comparison of the opening degree according to the number of expansion valves when a R410A refrigerant and R32 refrigerant are applied in the same system having of predetermined cooling/heating load conditions (minimum/rated/maximum).

In FIG. 10, minimum capacity is estimated as a capacity level of about 30% on the basis of the rated capacity, and testing of maximum capacity is performed at a capacity level of about 120% on the basis of the rated capacity. In addition, the reference for selecting the degree of opening may indicate the degree of opening under the state of cycle optimization, and may indicate the ratio of the opening degree to the full opening degree as a percentage %.

In the case of using the expansion valves used for the above-mentioned evaluation, the model having the range of warranty corresponding to a minimum opening degree ratio of about 16% is applied to the above expansion valves. As shown in FIG. 10, it can be recognized that the opening degree ratio is linearly increased in proportion to the increasing cooling/heating load. In the case of using R32 refrigerant, when only one expansion valve (EEV) is used, it can be recognized that the optimum opening degree equal to or less than the minimum opening degree guaranteed by the expansion valves in the minimum cooling/heating load condition is formed. In addition, it can also be recognized that the optimum opening degree is reduced to the minimum opening degree ratio even at the rated heating capacity.

In contrast, when two expansion valves (EEVs) are used, it can be recognized that cycle optimization is achieved at the same opening degree ratio as in the legacy 410A refrigerant. As a result, when two expansion valves are used, it can be recognized that the compression ratio is identical to that of the R410A refrigerant-based system.

As is apparent from the above description, the air conditioner and the method for controlling the same according to the embodiments of the present disclosure may implement a multistage expansion scheme by implementing serial connection between electronic expansion valves in the R410A refrigerant-based air conditioner, and may thus guarantee an optimum compression ratio in all cooling/heating load regions. Therefore, although cycle characteristics are changed by changing R410A refrigerant to R32 refrigerant, the air conditioner according to the embodiment may optimize the cycle simply by controlling the degree of opening of electronic expansion valves. As described above, since the cycle optimization can be implemented using the multistage expansion scheme in which legacy electronic expansion valves are coupled in series, design modification may be minimized without design modification of requisite constituent elements such as a heat exchanger, system implementation may be facilitated, resulting in high efficiency in cost and productivity. In addition, cooling/heating performance improvement and reliability guarantee may be achieved under all load conditions, resulting in increased system efficiency.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. An air conditioner comprising:
   a compressor configured to compress a refrigerant, the compressor being a rotary compressor using the refrigerant as an operating fluid;
   a flow passage switching valve configured to switch flow of the refrigerant according to at least one of a cooling mode and a heating mode, respectively;
   a revolutions per minute (RPM) detector configured to detect revolutions per minute (RPM) of the compressor;
   a discharge temperature detector configured to detect a refrigerant temperature at an outlet of the compressor;
   a multistage expansion device configured to decompress the refrigerant, the multistage expansion device including:
      a first expansion valve which decompresses a pressure of the refrigerant when the refrigerant is a high-pressure refrigerant, and
      a second expansion valve which decompresses the pressure of the refrigerant when the refrigerant is a medium-pressure refrigerant,
      wherein one of the first expansion valve and the second expansion valve is controlled to adjust a flow rate of the refrigerant so that a compression ratio and the flow rate are optimized based on the refrigerant used as the operating fluid among refrigerants having different physical properties that are useable by the multistage expansion device, and
   a controller configured to obtain a target opening degree of the first expansion valve and the second expansion valve, respectively, in response to a compressor discharge temperature detected by the discharge temperature detector and the RPM of the compressor detected by the RPM detector.

2. The air conditioner according to claim 1, wherein the refrigerant is R32 refrigerant, and
   the first expansion valve and the second expansion valve are connected in series to implement a 2-stage expansion scheme, and adjust a flow rate and a pressure of the R32 refrigerant through change of a degree of opening of the first expansion value and a degree of opening of the second expansion value, respectively.

3. The air conditioner according to claim 2, wherein the compressor is a revolutions per minute (RPM) variable type compressor having changeable capacity.

4. The air conditioner according to claim 3, further comprising:
   a controller configured to control the degree of opening of the first expansion valve and the degree of opening of the second expansion valve, respectively, so as to optimize the compression ratio in all load regions of the cooling mode and the heating mode, respectively.

5. The air conditioner according to claim 1, wherein the controller controls the target opening degree of the first expansion valve and the second expansion valve, respectively, by detecting the compressor discharge temperature and the compressor RPM at intervals of a predetermined time.

6. The air conditioner according to claim 1, further comprising:
   a detector configured to detect a current opening degree of the first expansion valve and the second expansion valve, respectively,
   wherein the controller periodically traces and controls the target opening degree of the first expansion valve and the second expansion valve, respectively, in response to the compressor discharge temperature, the compressor RPM, and the current opening degrees of the first expansion valve and the second expansion valve.

* * * * *